(12) United States Patent
Gostin et al.

(10) Patent No.: US 7,908,422 B2
(45) Date of Patent: *Mar. 15, 2011

(54) SYSTEM AND METHOD FOR A DISTRIBUTED CROSSBAR NETWORK USING A PLURALITY OF CROSSBARS

(75) Inventors: Gary B. Gostin, Richardson, TX (US); Mark E. Shaw, Richardson, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/481,628

(22) Filed: Jun. 10, 2009

(65) Prior Publication Data

US 2009/0248948 A1    Oct. 1, 2009

Related U.S. Application Data

(63) Continuation of application No. 11/346,041, filed on Feb. 2, 2006, now Pat. No. 7,568,063.

(51) Int. Cl.
*G06F 13/00* (2006.01)

(52) U.S. Cl. .......... 710/317; 710/316; 340/2.1; 340/2.2; 712/11; 712/12; 712/13; 712/32; 712/33

(58) Field of Classification Search .................. 710/306, 710/316, 317; 712/11, 12, 13, 32, 33; 340/2.1, 340/2.2

See application file for complete search history.

(56) References Cited

U.S. PATENT DOCUMENTS

| | | | | |
|---|---|---|---|---|
| 5,842,034 A | * | 11/1998 | Bolstad et al. | 712/11 |
| 5,859,975 A | * | 1/1999 | Brewer et al. | 709/213 |
| 5,881,272 A | * | 3/1999 | Balmer | 713/375 |
| 6,633,580 B1 | * | 10/2003 | Tørudbakken et al. | 370/461 |
| 6,836,815 B1 | * | 12/2004 | Purcell et al. | 710/317 |
| 7,107,386 B1 | * | 9/2006 | Purcell et al. | 711/5 |
| 7,249,214 B2 | * | 7/2007 | Purcell et al. | 710/317 |
| 7,353,362 B2 | * | 4/2008 | Georgiou et al. | 712/33 |
| 2006/0161718 A1 | * | 7/2006 | Berke et al. | 710/317 |
| 2006/0218348 A1 | * | 9/2006 | Shaw et al. | 711/118 |

OTHER PUBLICATIONS

Chi, Hsin-Chou. Crossbar Arbitration in Interconnection Networks for Multiprocessors and Multicomputers. UCLA. 1994.*
Webb, Brian. A Class of Highly Scalable Optical Crossbar-Connected Interconnection Networks (SOCNs) for Parallel Computing Systems. IEEE Transactions on Parallel and Distributed Systems. Vo. 11, No. 5, May 2000.*
Baker, Mark. Cluster Computing White Paper. Version 2.0. Dec. 28, 2000.*

* cited by examiner

*Primary Examiner* — Matthew D Spittle (57) ABSTRACT

A system and method for single hop, processor-to-processor communication in a multiprocessing system over a plurality of crossbars are disclosed. Briefly described, one embodiment is a multiprocessing system comprising a plurality of processors having a plurality of high-bandwidth point-to-point links; a plurality of processor clusters, each processor cluster having a predefined number of the processors residing therein; and a plurality of crossbars, one of the crossbars coupling each of the processors of one of the plurality of processor clusters to each of the processors of another of the plurality of processor clusters, such that all processors are coupled to each of the other processors, and such that the number of crossbars is equal to $[X*(X-1)/2]$, wherein X equals the number of processor clusters.

19 Claims, 7 Drawing Sheets

SYSTEM AND METHOD FOR A DISTRIBUTED CROSSBAR NETWORK USING A PLURALITY OF CROSSBARS

CROSS-REFERENCE TO RELATED APPLICATION

This application is a continuation of U.S. application Ser. No. 11/346,041, filed Feb. 2, 2006, which is entirely incorporated herein by reference.

TECHNICAL FIELD

Embodiments are generally related to parallel processing computer systems and, more particularly, are related to a system and method for single hop, processor-to-processor communication in a multiprocessing system over a plurality of crossbars.

BACKGROUND

Multiprocessing systems employ many parallel-operating central processing units (CPUs) which independently perform tasks under the direction of a single operating system. One type of multiprocessing system is based upon a plurality of CPUs employing high-bandwidth point-to-point links (rather than a conventional shared-bus architecture) to provide direct connectivity between the CPUs and to router devices, input/output (I/O) devices, memory units and/or other CPUs.

Another type of multiprocessing system is based upon a plurality of computing nodes, each node employing high-bandwidth point-to-point links to communicate with other nodes. Each node may contain a plurality of components such as CPUs, memory units, I/O devices, etc. Individual nodes may have a different number of components. Both of these types of multiprocessing systems share the common problem of building a communication fabric to interconnect the endpoints. These endpoints will be referred to here as "processors," but could be any type of computing block including CPUs, memory devices, I/O devices, cells, nodes, etc.

Multiprocessing system designs often allow processors to be grouped into "clusters" of processors. The clusters are communicatively coupled together via router devices, such as crossbars, to facilitate communications among the various processors of the clusters. A plurality of processor clusters and crossbars may be assembled onto modular boards or in a chassis to create a large multiprocessing system having many processors.

As the size of conventional multiprocessing systems increase, the number of ports, and hence the size of the crossbars, also increases. Larger crossbars may be more difficult and expensive to fabricate because of the associated large area of silicon required for fabrication, because of the inherent failure rates associated with large integrated circuits on a single die, and because of the larger number of ports.

When vendor-provided crossbars are used in the fabrication of multiprocessing systems, the multiprocessing system designers must use crossbars having a predefined number of ports available on a vendor-provided crossbar. Thus, design limitations may be encountered if a desired number of ports are not available on a vendor-provided crossbar to couple the desired number of CPUs (and/or other devices) together.

Conventional solutions to these problems use multiple levels of crossbars to interconnect the processors. This requires signals to propagate through two or more crossbars, increasing the latencies through the system and decreasing system performance.

SUMMARY

One embodiment is a multiprocessing system comprising a plurality of processors having a plurality of high-bandwidth point-to-point links, a plurality of processor clusters, each processor cluster having a predefined number of the processors residing therein, and a plurality of crossbars, one of the crossbars coupling each of the processors of one of the plurality of processor clusters to each of the processors of another of the plurality of processor clusters, such that all processors are coupled to each of the other processors, and such that the number of crossbars is equal to $(X*(X-1))/2$, wherein X equals the number of processor clusters.

Another embodiment is a method for processor-to-processor communication between any pair of processors in a multiprocessing system using a single hop across one crossbar, the method comprising communicating from a selected one of the processors of a first cluster to another one of the processors in a second one of a plurality of clusters via a first crossbar such that the communicating uses a single hop across the first crossbar, and wherein the processors of the first cluster are coupled to the processors of the second cluster via the first crossbar, communicating from the selected processor of the first cluster to another processor in a third one of the plurality of clusters via a second crossbar such that the communicating uses a single hop across the second crossbar, and wherein the processors of the first cluster are coupled to the processors of the third cluster via the second crossbar, and communicating from the selected processor of the first cluster to another processor in an $i^{th}$ one of a plurality of clusters via an $(i-1)^{th}$ crossbar such that the communicating uses a single hop across the $(i-1)^{th}$ crossbar, and wherein the processors of the first cluster are coupled to the processors of the $i^{th}$ cluster via the $(i-1)^{th}$ crossbar.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
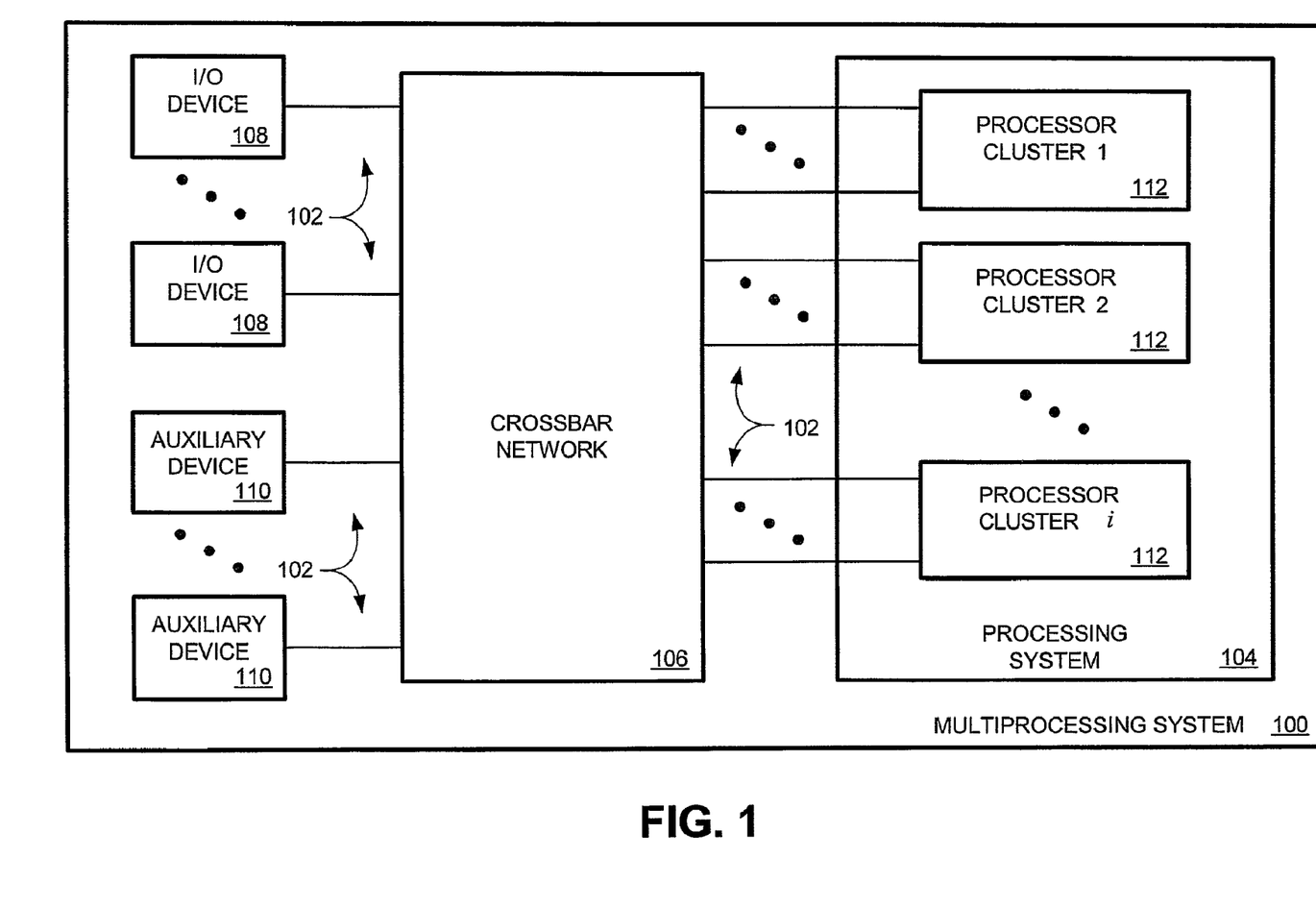
FIG. 1 is a block diagram illustrating an embodiment of a multiprocessing system.

FIG. 1 is a block diagram illustrating an embodiment of a multiprocessing system 100. Multiprocessing systems 100 employ many parallel-operating processing units which independently perform tasks under the direction of a single operating system. One embodiment of multiprocessing system 100 is based upon a plurality of processing units employing high-bandwidth point-to-point links 102 (rather than a conventional shared-bus architecture) to provide direct connectivity between the processing units and to input/output (I/O) devices, memory units and/or other processors.

Multiprocessing system 100 employs a processing system 104, crossbar network 106, an optional plurality of input/output devices 108, and an optional plurality of auxiliary devices 110. Processing system 104 comprises a plurality of processor clusters 112, described in greater detail below. I/O devices 108 may be devices for inputting or outputting information to another device or to a user, or may be suitable interfaces to such devices. Auxiliary devices 110 are other types of devices used in the multiprocessing system 100 that may be also coupled to the crossbar network 106 via links 102. An example of an auxiliary device 110 is a memory device or system. Crossbar network 106 comprises a plurality of crossbars, described in greater detail below, which communicatively couple the above-described components via links 102.

Figure 2:
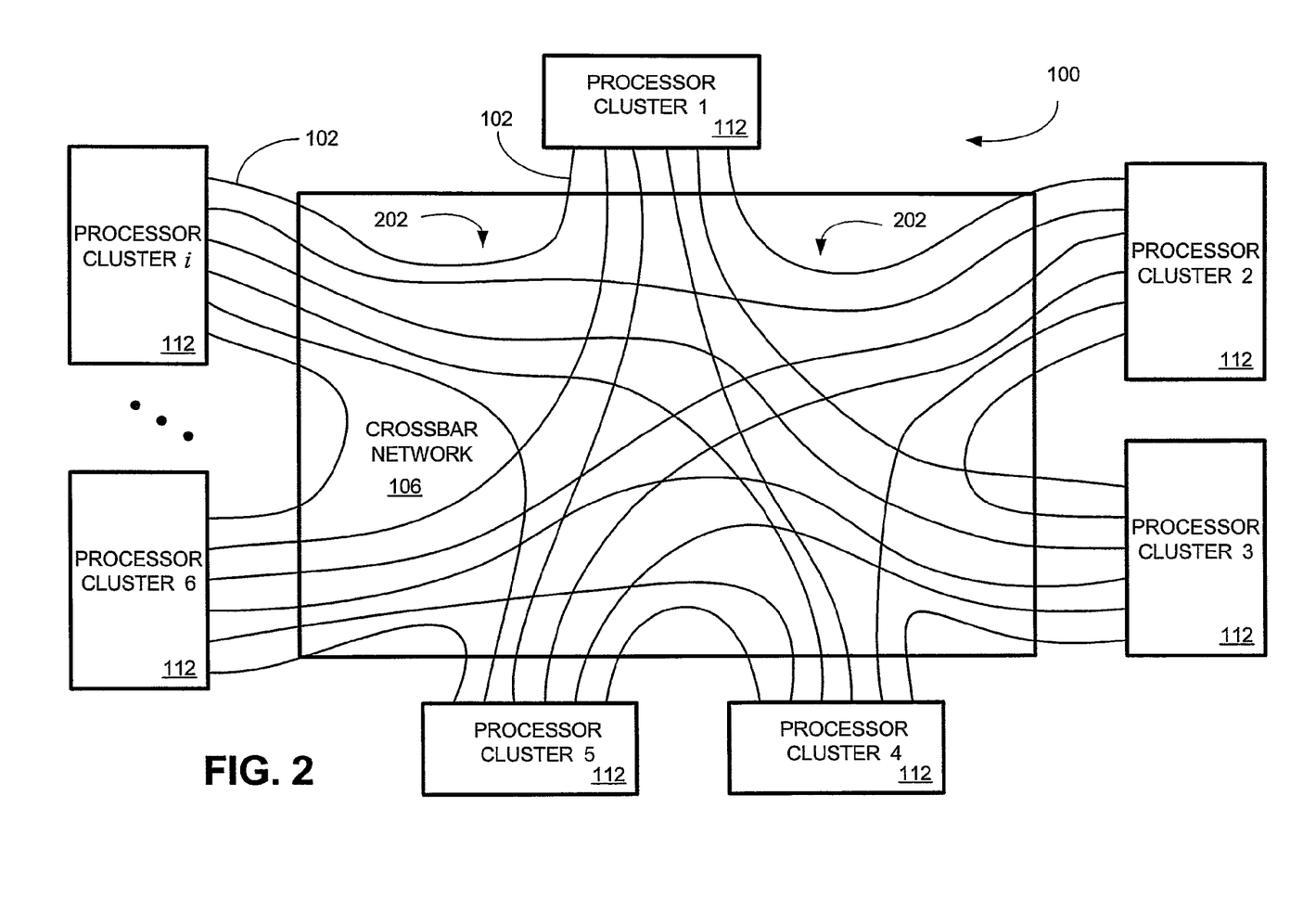
FIG. 2 is a block diagram of the multiprocessing system of FIG. 1 illustrating link paths between processor clusters via the crossbar network.

FIG. 2 is a block diagram of the multiprocessing system 100 illustrating link paths 202 between processor clusters via the crossbar network 106. A link path 202 generally denotes the shortest path through the crossbar network from one processor cluster to another processor cluster. A link group 102 denotes the set of links coupling the processors of a processor cluster 112 (FIG. 1) to one crossbar of the crossbar network 106. A link path therefore consists of the two link groups and one crossbar that couple the processors of one processor cluster to the processors of another processor cluster. In this illustrative embodiment of multiprocessing system 100, seven processor clusters 112 are illustrated (1-6 and i).

Each of the processor clusters 112 are coupled to the other processor clusters 112 via paths 202. Paths 202 correspond to the link groups 102, and the crossbars (not shown) residing in the crossbar network 106, described in greater detail below. With this illustrative embodiment, twenty-one link paths 202 are required to interconnect the seven processor clusters under a single-hop criteria. That is, once a crossbar (not shown) residing in the crossbar network 106 has established connectivity between processors in different processor clusters 112, communication between processors requires only one hop communication through that connecting crossbar.

If the processor clusters 112 (1-6 and i) each have a plurality of processors and/or other components (such as I/O devices or memory units that communicatively couple to other remote devices via crossbar network 106), the number of ports required of a single crossbar to interconnect all ports of all processors in all clusters becomes very large, if not impractical. Conventional solutions would employ a plurality of relatively large crossbars when a single large crossbar becomes impractical. However, the number of ports on these relatively large crossbars would have to equal the number of processors in the multiprocessing system to meet the single hop requirement, and therefore may still exceed practical limits. Accordingly, it is appreciated that at some point, a conventional multiprocessing system becomes limited in its number of processors (and/or other components) since crossbar size becomes limited.

Various embodiments of multiprocessing system 100 comprise a plurality of crossbars residing in a crossbar network 106. The plurality of crossbars are configured to provide single-hop connectivity between all of the processors residing in the multiprocessing system 100. That is, all of the processors (and/or other components) are coupled to each other such that a processor-to-processor communication requires a single hop across their respective crossbar.

Embodiments of the multiprocessing system 100 determine the number of crossbars required to provide single-hop connectivity between all of the processors residing in the multiprocessing system 100. The number of crossbars required, in one embodiment, is determined by:

$$\text{Crossbars} = X*(X-1)/2 \quad (1)$$

where a crossbar has a number of ports equal to twice the number of processors in a processor cluster, and X equals the number of processor clusters in the multiprocessing system 100.

Another embodiment of the multiprocessing system determines the number of crossbars required to provide single-hop connectivity between all of the processors residing in the multiprocessing system 100. The number of crossbars required, in this embodiment, is determined by:

$$\text{Crossbars} = X!/((X-2)!*2) \quad (2)$$

where a crossbar has a number of ports equal to twice the number of processors in a processor cluster, and X equals the number of processor clusters in the multiprocessing system 100. Further, the term X! corresponds to the mathematical procedure that calculates the factorial of X, and wherein the term (X−2)! corresponds to the mathematical procedure that calculates the factorial of the term (X−2).

Figure 3:
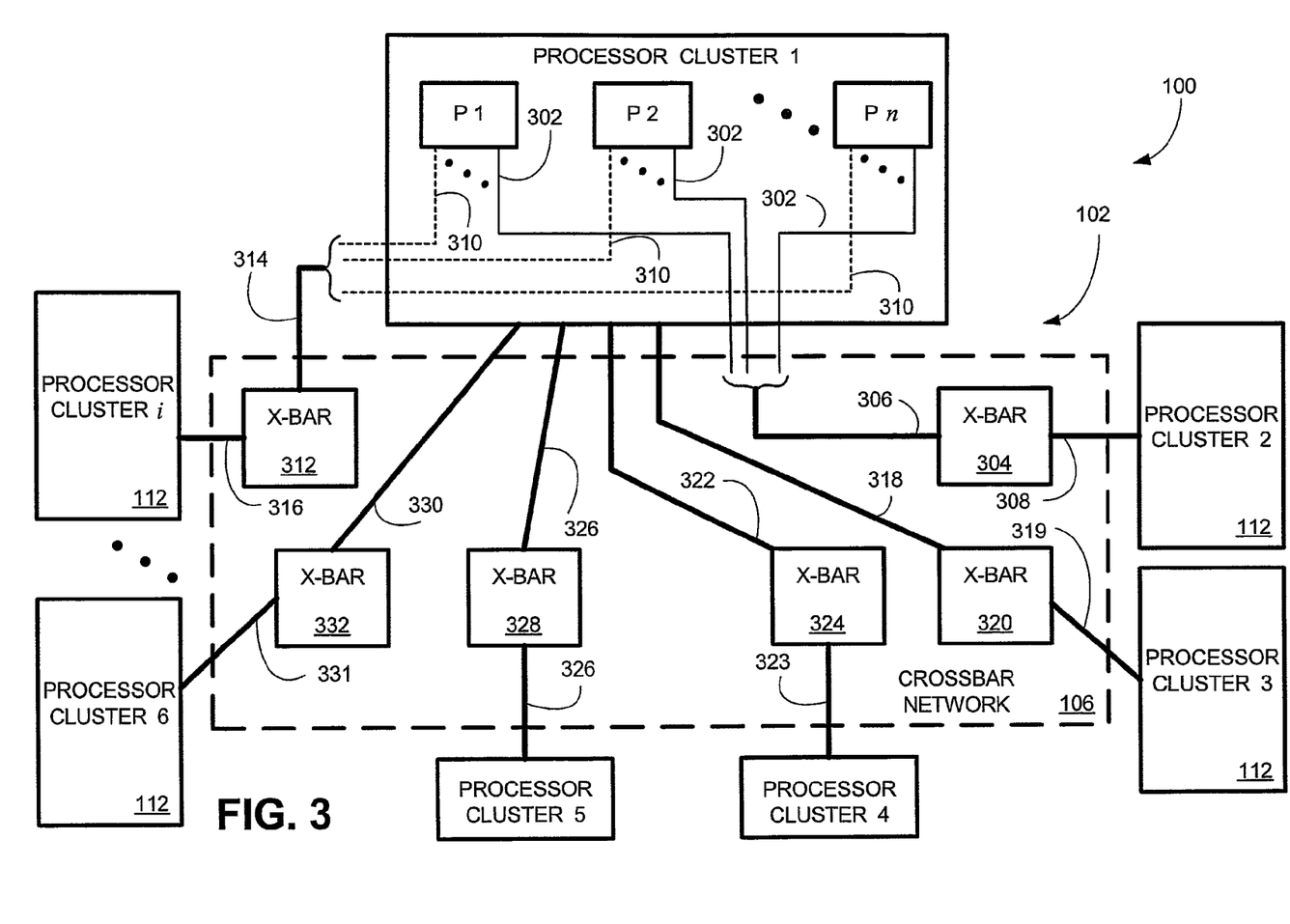
FIG. 3 is a block diagram of a portion of the multiprocessing system of FIG. 1 illustrating link paths from a first processor cluster, through a plurality of crossbars, to the other processor clusters.

FIG. 3 is a block diagram of a portion of the multiprocessing system 100 of FIG. 1 illustrating link paths from a first processor cluster, through a plurality of crossbars, to the other processor clusters. A plurality of processors P1, P2 through Pn reside in the processor cluster 1. Each of the processors P1, P2 through Pn have a plurality of links at least equal to one less than the number of processor clusters. A link couples one port from one of the processors P1, P2 through Pn to one port from one of the crossbars (generally denoted as an "X-bar" throughout the FIGs.). For example, if the multiprocessing system has seven processor clusters, then each of the processors P1, P2 through Pn would employ six links (7-1).

As noted above, other components residing in the processor clusters may have links to provide connectivity to other remote devices in other processor clusters. Non-limiting examples of other components include I/O devices or memory devices. Accordingly, in such embodiments, the processors P1, P2 through Pn may be replaced by other components. Furthermore, the processors P1, P2 through Pn may themselves be complex devices and have, for example, multiple CPUs and/or memory devices residing therein.

As an illustrative example, links 302 from processors P1, P2 through Pn connect to crossbar 304. The links 302, when considered in aggregate, correspond to the link group 306. Another link group 308 couples the crossbar 304 and processor cluster 2. Individual links (not shown) in the link group 308 provide coupling to the processors or other components (not shown) residing in processor cluster 2. Accordingly, processors P1, P2 through Pn are each coupled to the processors of processor cluster 2, via crossbar 304 and link groups 306 and 308. Crossbar 304 and link groups 306 and 308 corresponds to a link path 202

Similarly, links 310 from processors P1, P2 through Pn connect to crossbar 312. The links 310, when considered in aggregate, correspond to the link group 314. Link group 316 couples crossbar 312 and processor cluster i. Individual links (not shown) in the link group 316 provide coupling to the processors (not shown) residing in processor cluster i. Accordingly, processors P1, P2 through Pn are each coupled to the processors of processor cluster i, via crossbar 312 and link groups 314 and 316.

Links (not shown) from processors P1, P2 through Pn connect to processors (not shown) residing in processor cluster 3, via link groups 318 and 319, and crossbar 320, in a similar manner as described above for the coupling of processors P1, P2 through Pn to the processors of processor clusters 2 and i. Similarly, links (not shown) from processors P1, P2 through Pn connect to processors (not shown) residing in processor clusters 4, 5 and 6, via link groups 322 and 323 and crossbar 324, link groups 326 and 327 and crossbar 328, and link groups 330 and 331 and crossbar 332, respectively.

Figure 4:
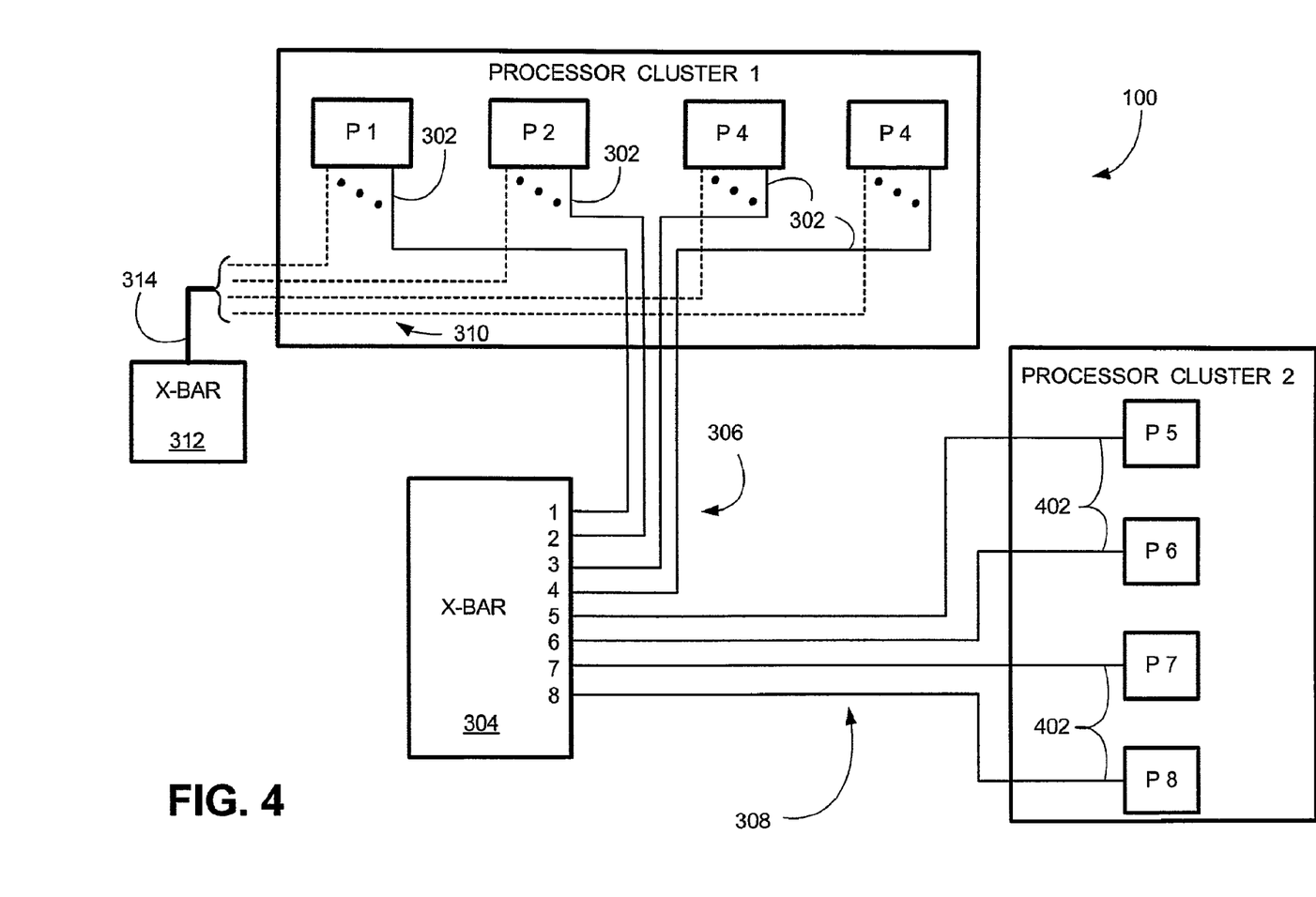
FIG. 4 is a block diagram illustrating in greater detail the coupling of processors in processor cluster 1 and processor cluster 2, via the link paths and the crossbar, of the multiprocessing system embodiment illustrated in FIG. 3.

FIG. 4 is a block diagram illustrating in greater detail the coupling of processors in processor cluster 1 and processor cluster 2, via the link groups 306 and 308, and crossbar 304, of the multiprocessing system 100 embodiment illustrated in FIG. 3. In this illustrative embodiment, processor clusters 1 and 2 (and also processor clusters 3-n, not shown) are configured with four processors each. Accordingly, processor cluster 1 has processors P1-P4, and processor cluster 2 has processors P5-P8. The links 402 from processors P5-P8 are the links corresponding to the link group 308. Crossbar 304 has eight ports, one port which uniquely couples to processors P1-P8. Thus, crossbar 304 has a number of ports (8) equal to twice the number of processors (2×4) in a processor cluster, as described above.

Figure 5:
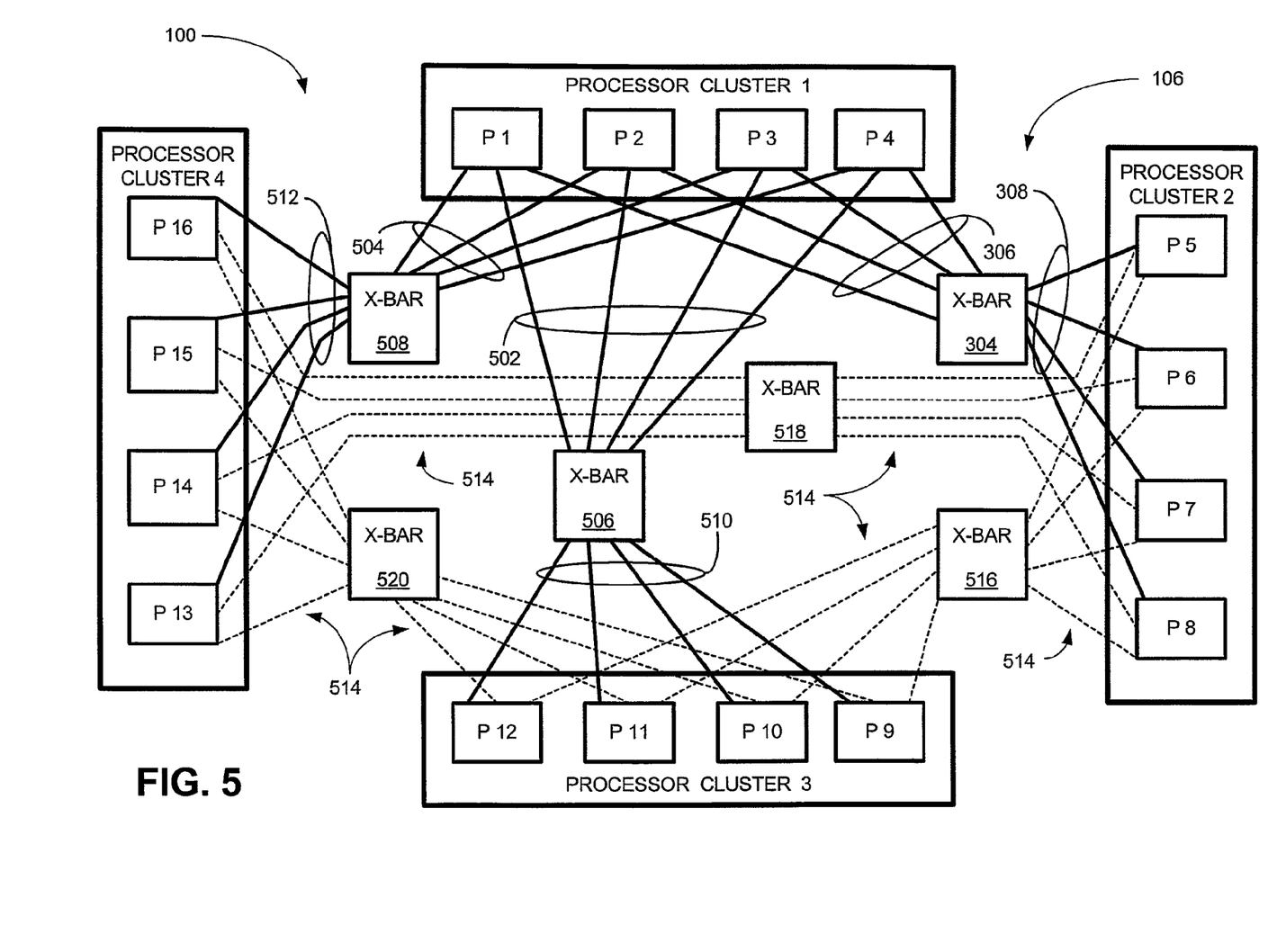
FIG. 5 is a block diagram of an embodiment of a multiprocessing system having four processor clusters, each with four processors, illustrating the determined number of crossbars and the links through the crossbars.

FIG. 5 is a block diagram of an embodiment of a multiprocessing system 100 having four processor clusters 1-4, each with four processors (P1-P4, P5-P8, P9-P12 and P13-P16, respectively), illustrating the determined number of crossbars and the links through the crossbars. That is, there are four processor clusters with four processors each. Accordingly, three links from each of the processors of a cluster are required for processor-to-processor communications. The number of links per processor equals:

$$\text{Links} = X - 1, \tag{3}$$

where X equals the number of processor clusters.

In accordance with equations (1) and (2) above, since there are four processor clusters, each with four processors, and since each of the crossbars have eight ports (twice the number of processors per processor cluster, or 4×2=8), embodiments of the multiprocessing system 100 require six crossbars.

With respect to FIG. 5, the processor clusters 1 and 2 (and their associated processors P1-P8), crossbar 304, and link groups 306 and 308, correspond to FIG. 4. Since each of the processors P1-P4 require three links each to provide connectivity to the other processors, FIG. 5 illustrates three link groups 306, 502 and 504 to crossbars 304, 506 and 508, respectively. Link group 510 couples the processors P9-P12 of processor cluster 3 to crossbar 506. Similarly, link group 512 couples the processors P13-P16 of processor cluster 4 to crossbar 508. Accordingly, all of the processors P1-P4 are coupled to the other processors, and to each other, via the three crossbars 304, 506 and 508. That is, all of the processors P1-P4 are coupled to the other processors, and to each other, with single-hop connectivity for processor-to-processor communications.

Other link groups 514 couple processors of one processor cluster with the processors of another processor cluster. (Individual links of the link paths 514 are illustrated with dashed lines.) For example, crossbar 516 provides connectivity between the processors P5-P8 of processor cluster 2 and the processors P9-P12 of processor cluster 3. Crossbar 518 provides connectivity between the processors P5-P8 of processor cluster 2 and the processors P13-P16 of processor cluster 4. And, crossbar 520 provides connectivity between the processors P9-P12 of processor cluster 3 and the processors P13-P16 of processor cluster 4. Thus, the crossbar network 106 provides single-hop connectivity between all of the processors P1-P16 residing in the multiprocessing system 100.

Figure 6:
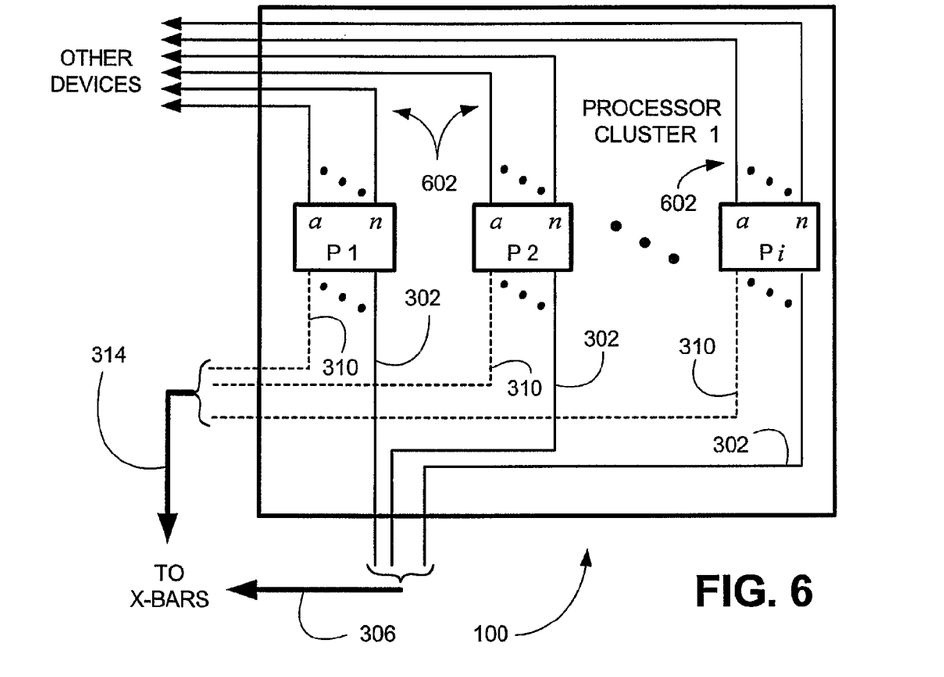
FIG. 6 is a block diagram of an embodiment of a multiprocessing system illustrating processors having additional links for coupling to input/output (I/O) devices and/or to other processors of a processor cluster.

FIG. 6 is a block diagram of an embodiment of a multiprocessing system 100 illustrating processors P1-Pi having additional ports a-n, coupled to links 602. Links 602 may be used to couple to other devices, such as, but not limited to, I/O devices and/or memory devices.

Figure 7:
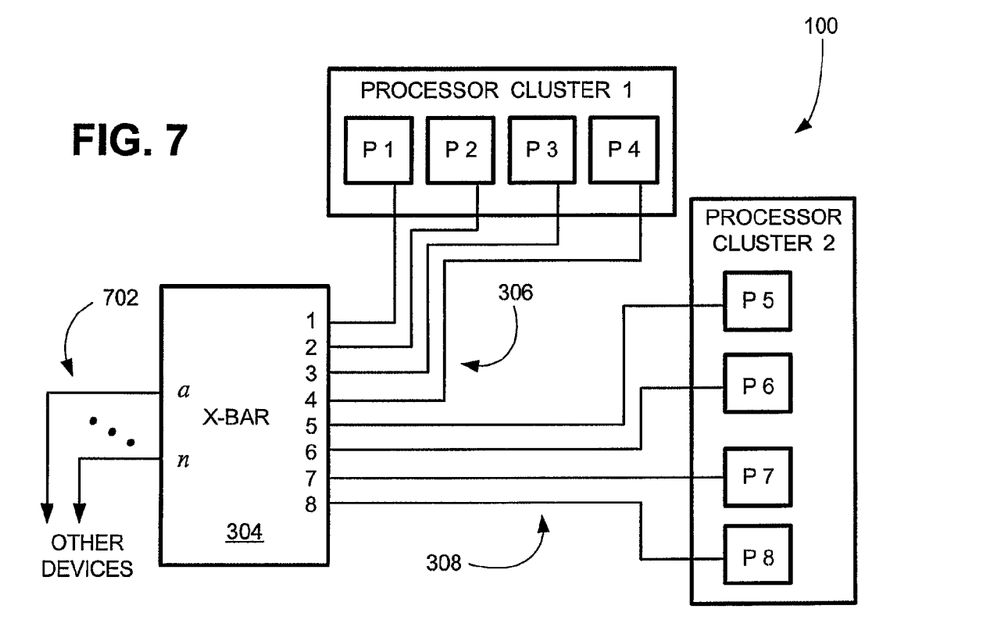
FIG. 7 is a block diagram of an embodiment of a multiprocessing system illustrating an 8+n port crossbar that has additional links for coupling to input/output (I/O) devices and/or to other crossbars.

FIG. 7 is a block diagram of an embodiment of a multiprocessing system 100 illustrating an 8+n port crossbar that permits additional links for coupling to other devices, such as input/output (I/O) devices, memory devices and/or other crossbars. Here, since the illustrative embodiment of FIG. 4 is again used, there are eight ports 1-8 that couple to the links of link groups 306 and 308, thereby providing connectivity between the processors P1-P4 of the processor cluster 1 and the processors P5-P8 of processor cluster 2. The ports a-n, coupled to links 702, provide for coupling to the other devices.

Figure 8:
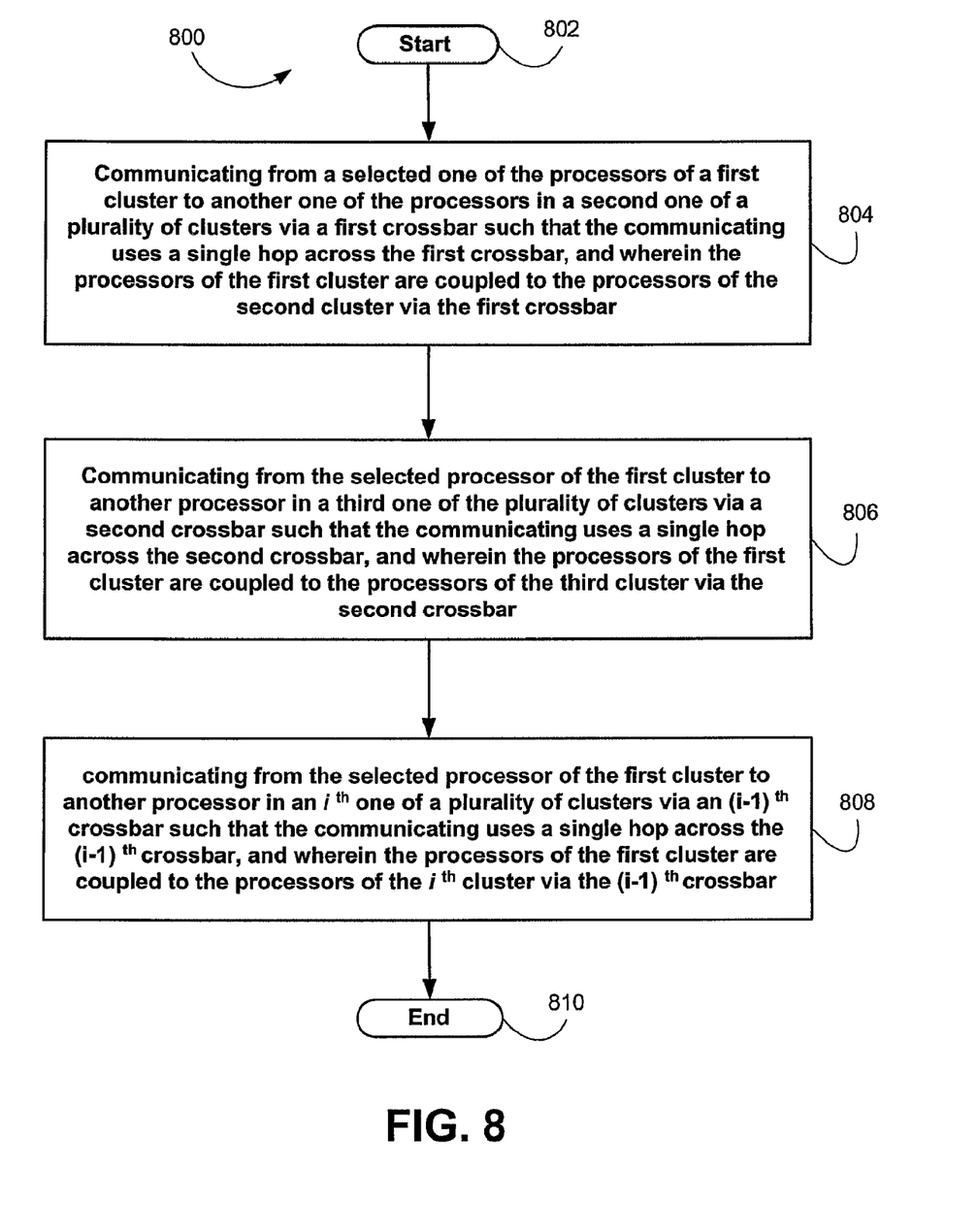
FIG. 8 is a flowchart illustrating an embodiment of a process for single-hop connectivity for processor-to-processor communications over a single crossbar.

FIG. 8 is a flowchart 800 illustrating an embodiment of a process for single-hop connectivity for processor-to-processor communications using multiple crossbars. Alternative embodiments implement the processes of flowchart 800 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 8, or may include additional functions. For example, two blocks shown in succession in FIG. 8 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process of flow chart 800 begins at block 802. At block 804, a selected one of the processors of a first cluster communicates to another one of the processors in a second one of a plurality of clusters via a first crossbar such that the communicating uses a single hop across the first crossbar, and wherein the processors of the first cluster are coupled to the processors of the second cluster via the first crossbar. At block 806, the selected processor of the first cluster communicates to another processor in a third one of the plurality of clusters via a second crossbar such that the communicating uses a single hop across the second crossbar, and wherein the processors of the first cluster are coupled to the processors of the third cluster via the second crossbar. At block 808, the selected processor of the first cluster communicates to another processor in an $i^{th}$ one of a plurality of clusters via an $(i-1)^{th}$ crossbar such that the communicating uses a single hop across the $(i-1)^{th}$ crossbar, and wherein the processors of the first cluster are coupled to the processors of the $i^{th}$ cluster via the $(i-1)^{th}$ crossbar. The process ends at block 810.

It should be emphasized that the above-described embodiments are merely examples of the disclosed system and method. Many variations and modifications may be made to the above-described embodiments. All such modifications and variations are intended to be included herein within the scope of this disclosure.

What is claimed is:

1. A multiprocessing system comprising:
   a plurality of processors having a plurality of high-bandwidth point-to-point links;
   a plurality of processor clusters, each processor cluster having a predefined number of the processors residing therein, each of the high-bandwidth point-to-point links being from one respective processor residing in one of the plurality of processor clusters to another respective processor residing in one of plurality of the processor clusters, each of the processor clusters having a number of link groups equal to the number of processor clusters minus one; and
   a plurality of crossbars, one of the crossbars coupling each of the processors of one of the plurality of processor clusters to each of the processors of another of the plurality of processor clusters, such that all processors are communicatively coupled to each of the other processors, and such that the number of crossbars is equal to $[X*(X-1)/2]$, wherein X equals the number of processor clusters.

2. The multiprocessing system of claim 1, wherein the crossbars further comprise a number of ports equaling two times the number of processors residing in each of the processor clusters.

3. The multiprocessing system of claim 2, wherein the crossbars further comprise at least one additional port for coupling to a memory device.

4. The multiprocessing system of claim 2, wherein the crossbars further comprise at least one additional port for coupling to an input/output device.

5. The multiprocessing system of claim 1, further comprising a crossbar network wherein the crossbars reside.

6. The multiprocessing system of claim 1, wherein the processors use a predefined number of their links for coupling to their respective crossbars, wherein the number of links equals the number of processor clusters minus one.

7. The multiprocessing system of claim 6, wherein the processors use at least one of their remaining links for coupling to a memory device.

8. The multiprocessing system of claim 6, wherein the processors use at least one of their remaining links for coupling to an input/output device.

9. The multiprocessing system of claim 1, wherein the processors of a first one of the plurality of processor clusters are coupled to each other via their respective crossbars.

10. The multiprocessing system of claim 1, wherein all of the processors are coupled to each other with one of the crossbars, such that a processor-to-processor communication requires a single hop across their respective crossbar.

11. The multiprocessing system of claim 1, further comprising a plurality of link groups, each link group having one link from each of the processors of a processing cluster, and wherein each crossbar couples to only two link groups such that the processors of one of the plurality of processor clusters communicatively couple only to the processors of another of the plurality of processor clusters through the crossbar.

12. A method for processor-to-processor communication between any pair of processors in a multiprocessing system using a single hop across one crossbar, the method comprising:
    specifying a plurality of link groups for a processor cluster, wherein a link group is a group of high-bandwidth point-to-point links, each link being from one of a plurality of processors residing in the processor cluster, each processor cluster having a number of link groups equal to the number of processor clusters minus one; and
    coupling each link group of the processor cluster to the link group of another processor cluster via one crossbar, wherein the total number of crossbars is equal to $[X*(X-1)/2]$ and wherein X equals the number of processor clusters in the multiprocessing system, such that the processors in the multiprocessing system are communicatively coupled together via one of the crossbars.

13. The method of claim 12, further comprising communicating from the selected processor of the first cluster to another processor in a fourth one of the plurality of clusters via a fourth crossbar such that the communicating uses a single hop across the fourth crossbar, and wherein the processors of the first cluster are coupled to the processors of the fourth cluster via the fourth crossbar.

14. The method of claim 12, further comprising using at least one of the links for coupling with a memory device.

15. The method of claim 12, further comprising using one of the links for coupling to an input/output device.

16. The method of claim 12, wherein the crossbars include a number of ports equaling two times the number of processors residing in each of the processor clusters.

17. The method of claim 16, further comprising using at least one port of the crossbars for coupling to a memory device.

18. The method of claim 16, further comprising using at least one port of the crossbars for coupling to an input/output device.

19. The method of claim 12, wherein the processors of a first one of the plurality of processor clusters communicate with each other via their respective crossbars.

* * * * *